(12) United States Patent
Griffin, II et al.

(10) Patent No.: US 9,932,524 B1
(45) Date of Patent: Apr. 3, 2018

(54) METHOD, APPARATUS AND SYSTEM FOR PROCESSING MATERIALS FOR RECOVERY OF CONSTITUENT COMPONENTS

(71) Applicant: Biomass Industries, Inc., Bethel, CT (US)

(72) Inventors: Douglas D. Griffin, II, Bethel, CT (US); Joachim P. Roesler, New Canaan, CT (US)

(73) Assignee: MODERN RECOVERY SYSTEMS, INC., Bethel, CT (US)

( * ) Notice: Subject to any disclaimer, the term of this patent is extended or adjusted under 35 U.S.C. 154(b) by 542 days.

(21) Appl. No.: 14/611,688

(22) Filed: Feb. 2, 2015

Related U.S. Application Data

(60) Provisional application No. 61/935,187, filed on Feb. 3, 2014.

(51) Int. Cl.
| | |
|---|---|
| *C10B 7/10* | (2006.01) |
| *C10B 57/12* | (2006.01) |
| *C10B 1/10* | (2006.01) |
| *C10B 21/08* | (2006.01) |

(52) U.S. Cl.
CPC ............... *C10B 57/12* (2013.01); *C10B 1/10* (2013.01); *C10B 21/08* (2013.01)

(58) Field of Classification Search
CPC .. C10B 47/44; C10B 47/30; C10G 2300/1003
USPC ........ 422/258, 269, 150, 610, 204; 202/100, 202/118
See application file for complete search history.

(56) References Cited

U.S. PATENT DOCUMENTS

| | | | |
|---|---|---|---|
| 5,009,511 A | 4/1991 | Sarko et al. | |
| 5,716,205 A | * 2/1998 | Tratz | ....................... C10B 47/30 432/103 |
| 8,551,294 B2 | 10/2013 | Kelley | |

OTHER PUBLICATIONS

A. Chaala, et al; "Preliminary investigation of the vacuum pyrolysis of bituminous roofing waste materials"; J. Environ, Eng. Sci. 2: 119-126 (2003); pp. 119-126.

* cited by examiner

*Primary Examiner* — Natalia Levkovich
(74) *Attorney, Agent, or Firm* — Ware, Fressola, Maguire & Barber LLP

(57) ABSTRACT

The present invention is directed to processing feedstock materials for recovery, recycling and/or reuse of the constituent components of the feedstock materials, and includes adding feedstock materials at a constant temperature to a thermal reactor, heating the feedstock materials at a temperature of 1,100° F. or higher in an anaerobic environment within the thermal reactor to produce cracked and gasified hydrocarbons and residual material, removing cracked and gasified hydrocarbons released from the feedstock materials from the thermal reactor, further processing the residual material to recover one or more constituent component of the feedstock materials, and oxidizing the cracked and gasified hydrocarbons removed from the thermal reactor having five or less carbon atoms in their molecular structure in order to produce heat to obtain the temperature of 1,100° F. or higher for the thermal reactor. The present invention further includes systems, reactors and apparatuses configured to perform the processes of the present invention.

7 Claims, 12 Drawing Sheets

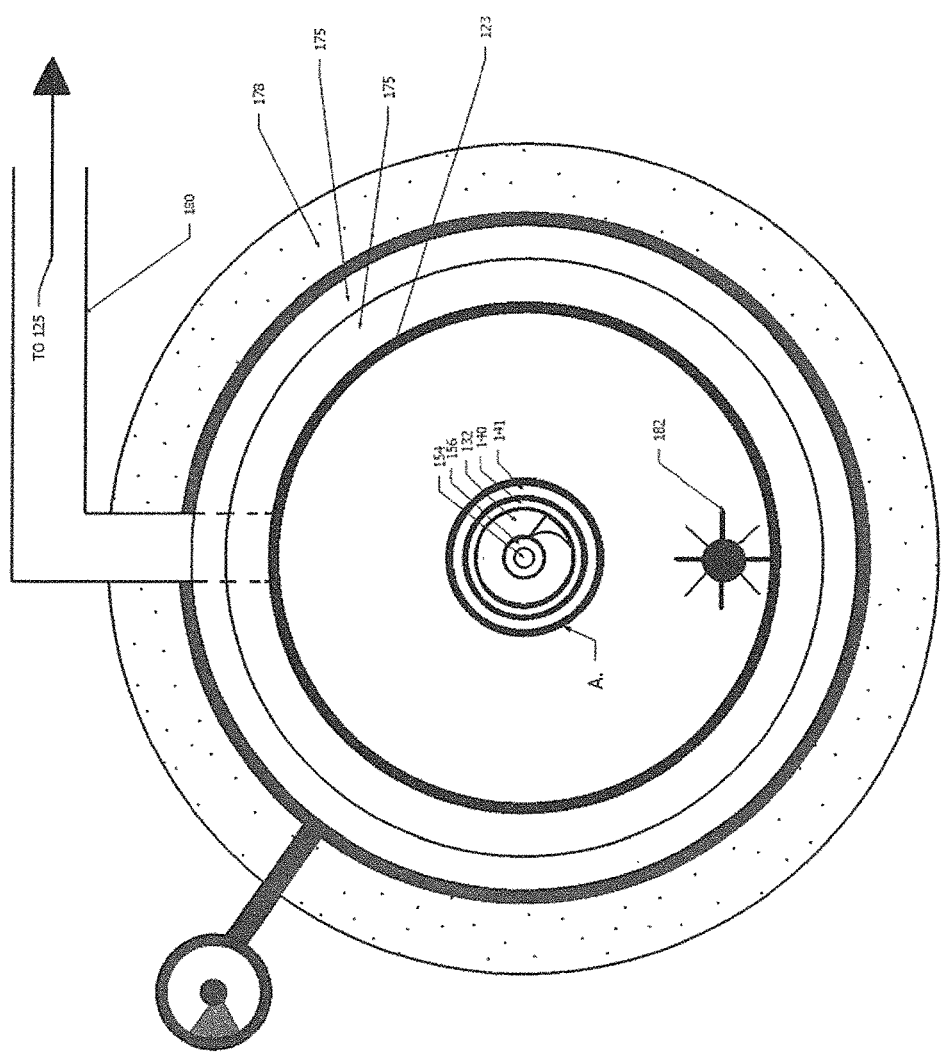

METHOD, APPARATUS AND SYSTEM FOR PROCESSING MATERIALS FOR RECOVERY OF CONSTITUENT COMPONENTS

CROSS-REFERENCE TO RELATED APPLICATIONS

This application claims priority to U.S. Provisional Appl. No. 61/935,187 filed Feb. 3, 2014, which is hereby incorporated by reference in its entirety.

BACKGROUND OF THE INVENTION

1. Field of the Invention

This invention generally relates to processing of a waste product and/or raw material in order to recover, reuse and/or recycle components of the product and/or material that may have useful economical, environmental, industrial and/or commercial value. More particularly, exemplary embodiments of the present invention generally relate to processes, apparatuses and systems for the processing of asphalt roofing shingles in order to recover, reuse and/or recycle the constituent components comprising the asphalt roofing shingles.

2. Description of Related Art

A great deal of waste products are generated as byproducts from industrialized societies, and substantial effort is used in the removal, disposal, recycling and/or containing of these waste products. Many waste products do not have any useful purpose or function once the useful life of the original product has expired, and these waste products may generally be disposed of and/or contained within ever increasing landfills. Furthermore, recycling processes, while potentially reducing the amount of waste products that are disposed of, may be uneconomical and produce inferior or less useful products from the recycled waste products. In particular, asphalt roofing shingles and other asphalt based roofing materials are removed from building structures, which produces many tons of waste roofing products. These waste roofing products may contain useful components, but prior asphalt roofing shingle recycling has not yielded desirable constituent components of the asphalt roofing shingles or useful products from the components of the asphalt roofing shingles that are able to be reused. Therefore, what is needed is a means for recovering, reusing and/or recycling the components of waste products, such as asphalt roofing shingles, so as to produce useful products from the waste products in an economical and/or environmental fashion.

SUMMARY OF THE INVENTION

The present invention is designed to overcome the above noted limitations that are attendant upon the use of conventional waste product processing and recycling techniques and, toward this end, it contemplates the provision of a novel method, apparatus and system for the processing of materials to recover the constituent components of the feedstock materials.

It is an object of the present invention to provide methods, apparatuses and systems that are configured to economically and efficiently process waste products and/or raw materials in order to obtain useful constituent components of the waste products and/or raw materials.

It is another object of the present invention to provide methods, apparatuses and systems that are configured to process waste products and/or raw materials in order to reduce the amount of waste products and raw material byproducts that need to be stored in waste disposal areas.

It is still another object of the present invention to provide methods, apparatuses and systems that are configured to process waste products and/or raw materials and use at least a portion of the constituent components obtained from the waste products and/or raw materials as inputs to drive the methods, apparatus and systems.

It is yet another object of the present invention to provide methods, apparatuses and systems that are configured to process waste products and/or raw materials in order to obtain a variety of useful constituent components of the waste products and/or raw materials that can be reused and/or recycled for a variety of different commercial and/or industrial applications.

It has now been found that the foregoing and related objects can be readily attained in an exemplary process that includes obtaining a waste product and/or raw material, processing, such as by grinding the waste product and/or raw material into a uniform size, conditioning the ground waste product and/or raw material to obtain a consistent moisture content throughout the ground waste product and/or raw material, and adding the ground waste product and/or raw material to an anaerobic reactor. The exemplary process may also include adding a hydrogen donor material to the anaerobic reactor in addition to the waste product and/or raw material. The exemplary process may further include heating the waste product and/or raw material in the anaerobic reactor to a temperature of 1,100° F. or greater in the absence of oxygen, continuing to heat the waste product and/or raw material within the reactor to produce a hydrocarbon gas mixture of cracked and gasified hydrocarbon, and removing these hydrocarbon gases from the reactor.

The exemplary process may also include condensing C6 and greater hydrocarbons from the removed hydrocarbon gases, and capturing non-condensable removed hydrocarbon gases to be used as fuel for a heat source of the reactor. The process may further include removing a solid residue produced from the processed waste product and/or raw material from the reactor, and separating the solid residue by particle size. The exemplary process may also include further heating the solid residue or portions thereof to at least 1,500-2,000° F. in the absence of oxygen, and/or include heating the solid residue or portions thereof in the presence of oxygen at a temperature of 1,100° F. or greater.

The present invention may be further directed to processing feedstock materials for recovery, recycling and/or reuse of the constituent components of the feedstock materials, and includes adding feedstock materials at a constant temperature to a thermal reactor, heating the feedstock materials at a temperature of 1,100° F. or higher in an anaerobic environment within the thermal reactor to produce cracked and gasified hydrocarbons and residual material, removing cracked and gasified hydrocarbons released from the feedstock materials from the thermal reactor, further processing the residual material to recover one or more constituent component of the feedstock materials, and oxidizing the cracked and gasified hydrocarbons removed from the thermal reactor having five or less carbon atoms in their molecular structure in order to produce heat to obtain the temperature of 1,100° F. or higher for the thermal reactor.

The present invention may also be directed to a reactor configured to process feedstock materials for recovery, recycling and/or reuse of the constituent components of the feedstock materials and the reactor may include a feeding mechanism configured to the feed feedstock materials at a constant temperature to the reactor, a rotating drum configured for heating the feedstock materials at a temperature of 1,100° F. or higher in an anaerobic environment to produce cracked and gasified hydrocarbons and residual material, a condensing system configured to receive cracked and gasified hydrocarbons released from the feedstock materials from the thermal reactor, a discharge system configured to remove the residual material from the rotating drum without introducing oxygen into the rotating drum in order to recover one or more constituent component of the feedstock materials, and a combustion chamber configured for oxidizing the cracked and gasified hydrocarbons removed from the rotating drum having five or less carbon atoms in their molecular structure in order to produce heat to obtain the temperature of 1,100° F. or higher for the rotating drum.

BRIEF DESCRIPTION OF THE SEVERAL VIEWS OF THE DRAWINGS

For a fuller understanding of the nature and object of the present invention, reference should be had to the following detailed description taken in connection with the accompanying drawings, in which:

FIG. 8A is an expanded view from FIG. 8;

FIG. 9 is a cross-sectional view taken along line 9-9 from FIGS. 5, 8 and 8A;

DETAILED DESCRIPTION OF THE INVENTION

Figure 1:
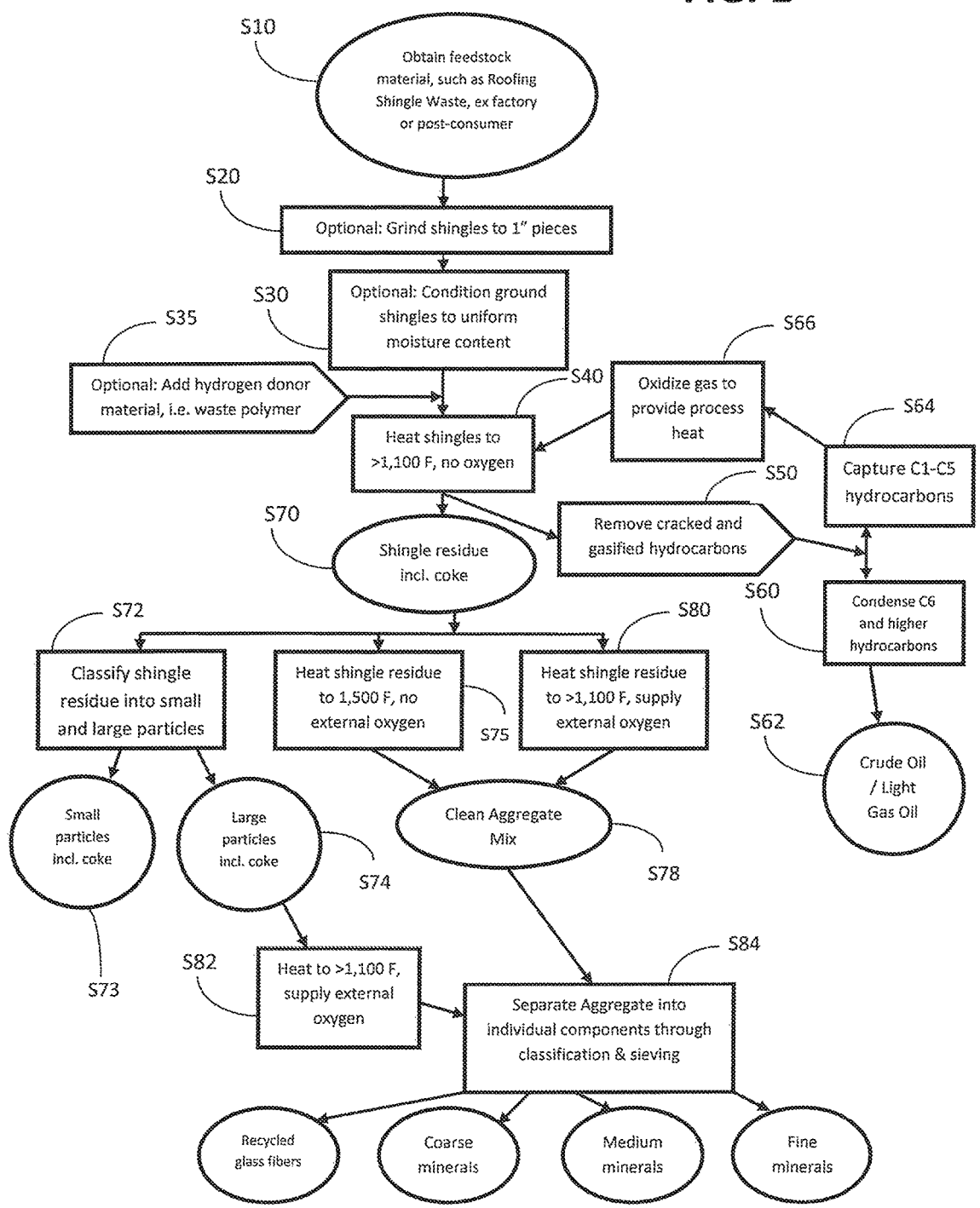
FIG. 1 is a flowchart for an exemplary method for processing waste products and/or raw materials according to an exemplary embodiment of the present invention.
Figure 2:
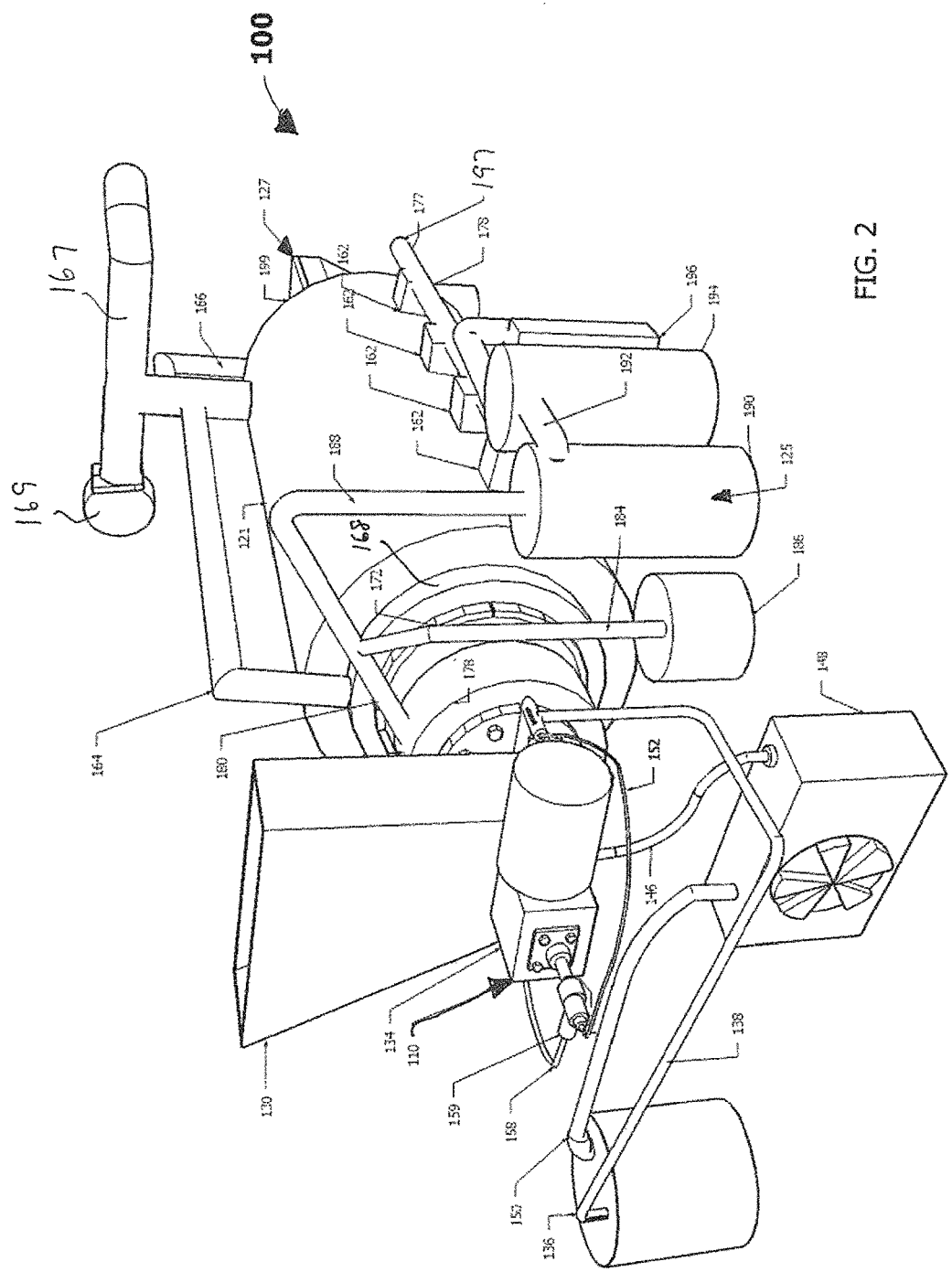
FIG. 2 is a front isometric view of an exemplary reactor configured for processing waste products and/or raw materials according to exemplary embodiments of the present invention.
Figure 3:
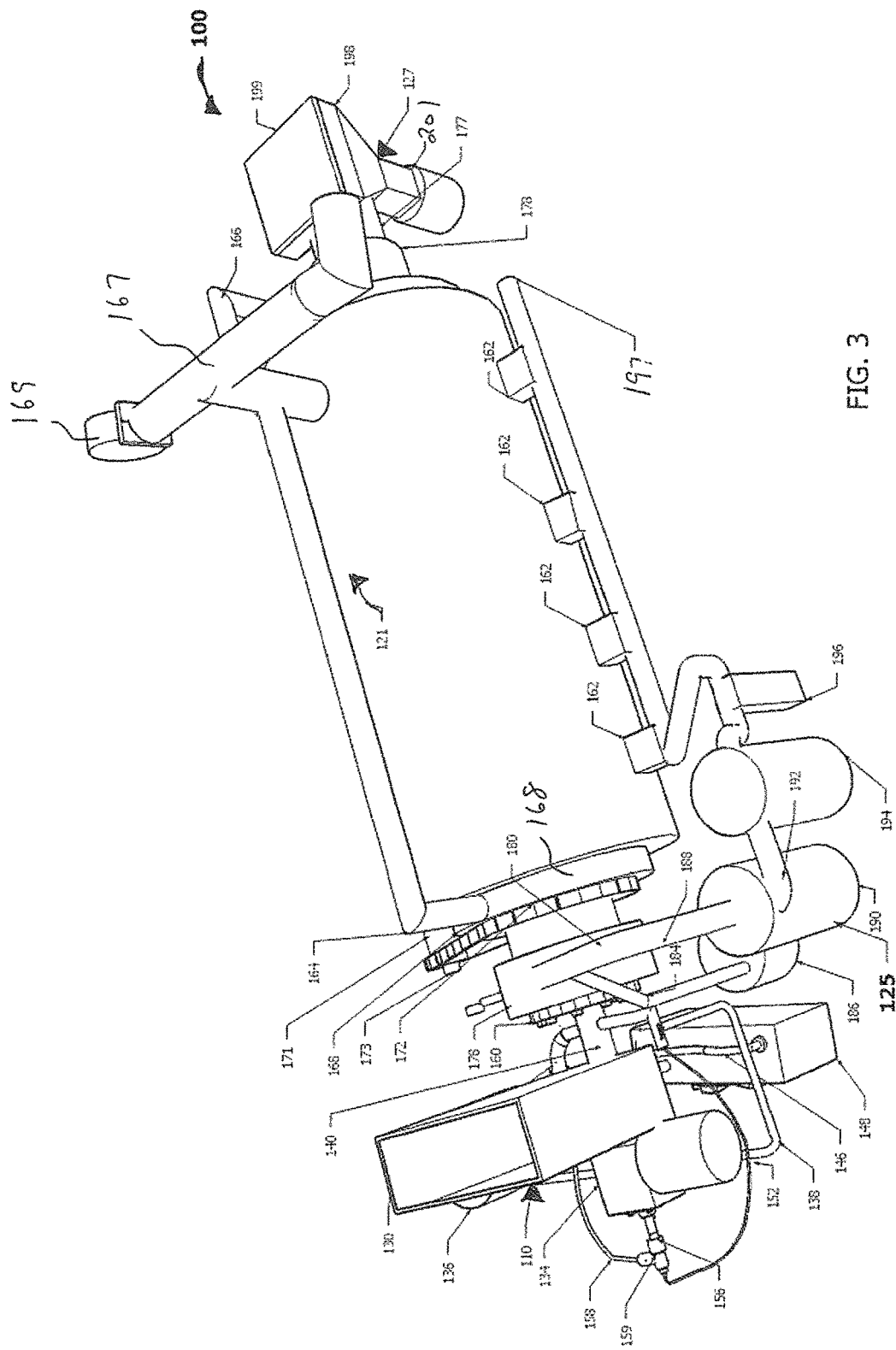
FIG. 3 is a top left-side isometric view of the exemplary reactor according to exemplary embodiments of the present invention.
Figure 4:
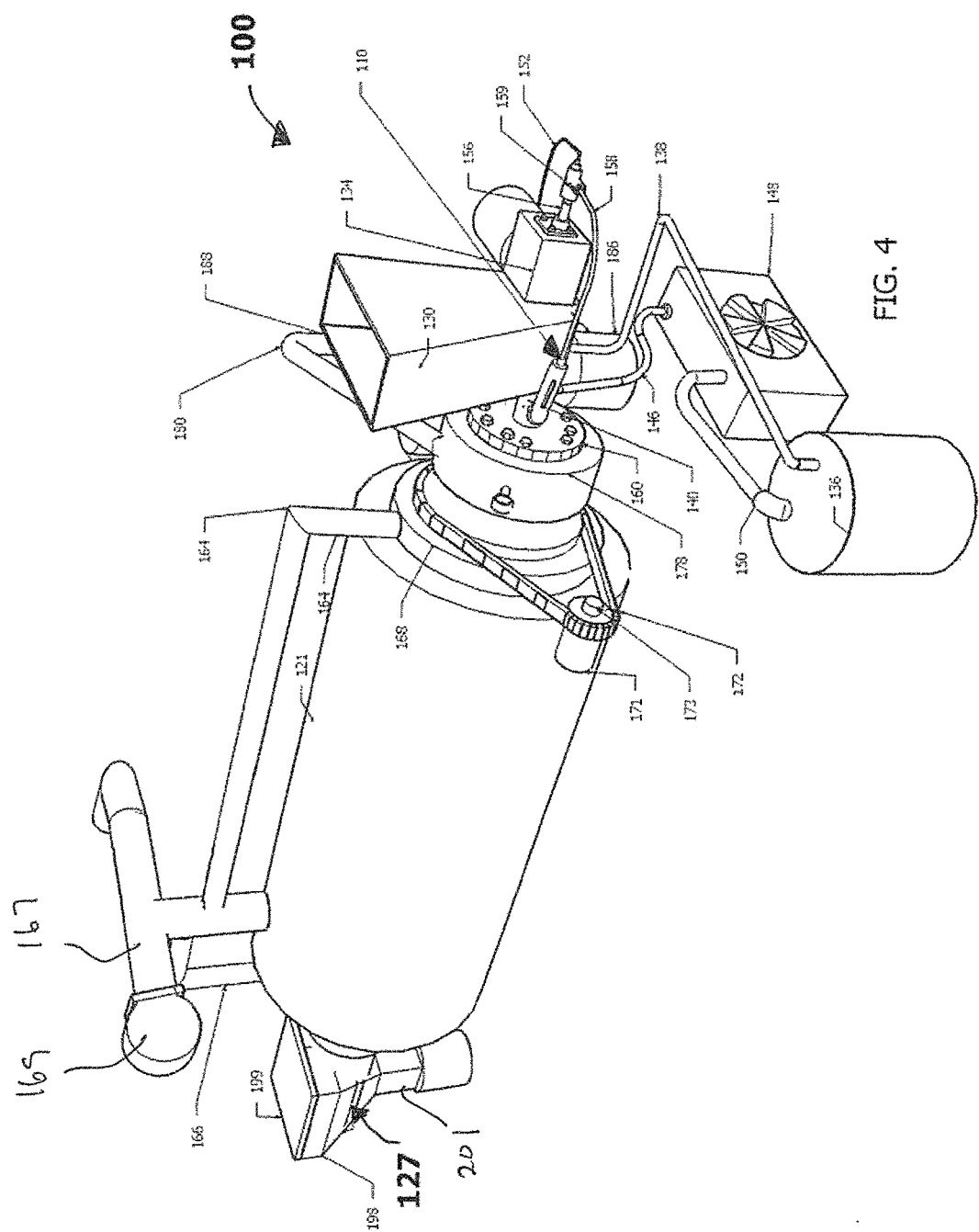
FIG. 4 is a right-side isometric view of the exemplary reactor according to exemplary embodiments of the present invention.
Figure 5:
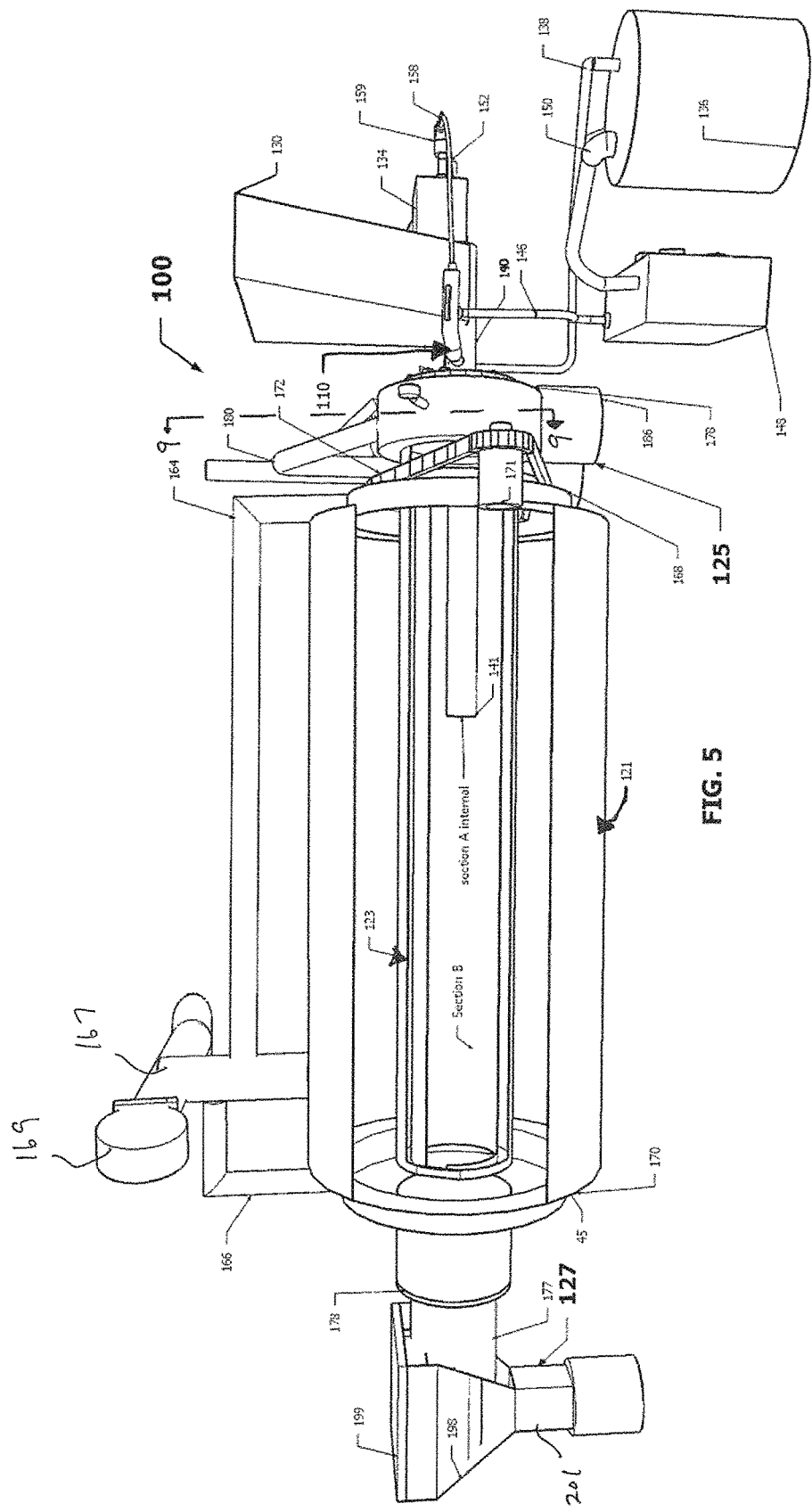
FIG. 5 is a right-side view of the exemplary reactor according to exemplary embodiments of the present invention, portions of the reactor have been cut-away in order to show internal structure and/or components of the portions of the reactor.
Figure 6:
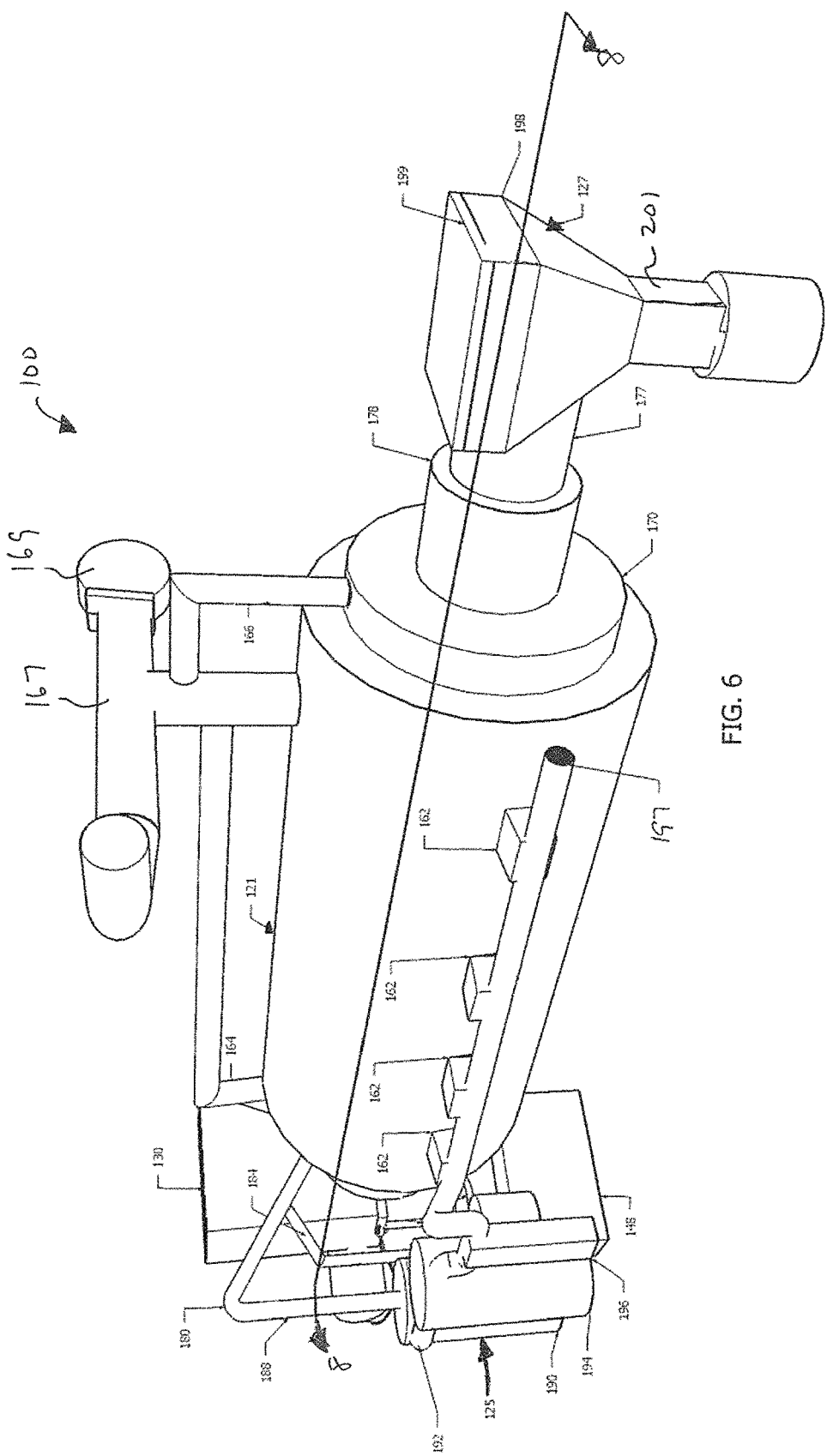
FIG. 6 is a rear isometric view of the exemplary reactor according to exemplary embodiments of the present invention.
Figure 7:
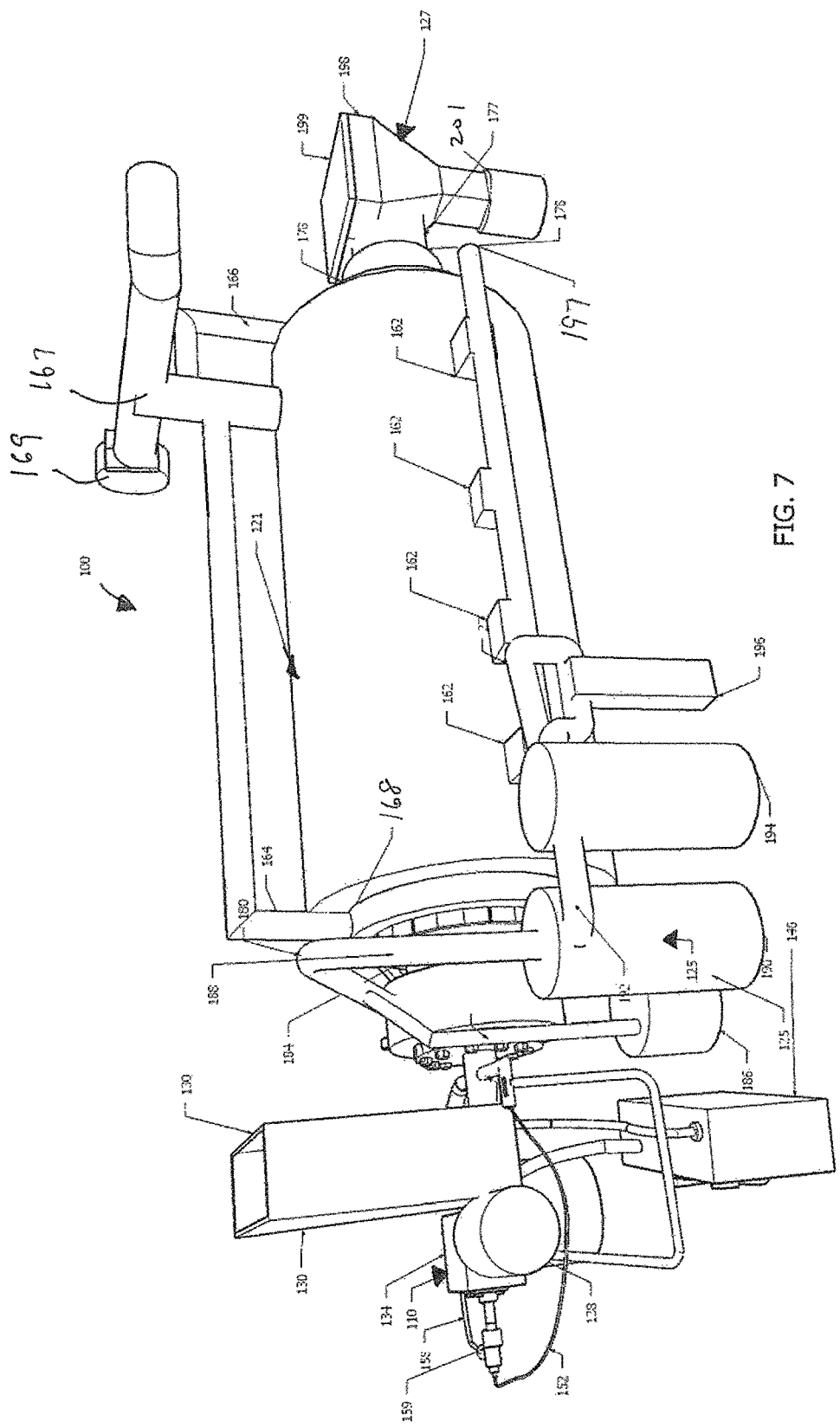
FIG. 7 is a side isometric view of the exemplary reactor according to exemplary embodiments of the present invention.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Referring now to FIGS. 2-8, therein illustrated is an exemplary reactor, generally indicated by reference numeral 100, according to the present invention. The reactor 100 generally includes a feeding mechanism, generally indicated by reference numeral 110, that is configured to feed a waste product, for example asphalt roofing shingles, and/or a raw material, for example Canadian tar sands, for processing into the reactor 100, which waste product(s) and/or raw material(s) are hereinafter generally referred to as feedstock materials. The reactor 100 also generally includes a combustion chamber 121 operatively connected to the feeding mechanism 110 and surrounding a rotating drum 123, as shown for example in FIG. 5. It is understood that the configuration of the combustion chamber 121 and the rotating drum 123 may generally have the form of a calciner, and that the reactor 100 may be configured to apply heat from the combustion chamber 121 to the feedstock materials in the rotating drum 123 in order to process the feedstock materials in accordance with exemplary embodiments of the present invention. The reactor 100 further includes a condensing system 125 operatively coupled to the rotating drum 123, and configured to collect and/or condense gas and other volatiles emitted from the feedstock materials fed into the rotating drum 123. The reactor 100 further may include a discharge system 127 operatively coupled to the rotating drum 123 and configured to discharge the solid and/or residual components of the feedstock materials, and preferably discharge the solid and/or residual components of the feedstock materials without introducing oxygen into rotating drum 123 and/or reactor 100.

Figure 8:
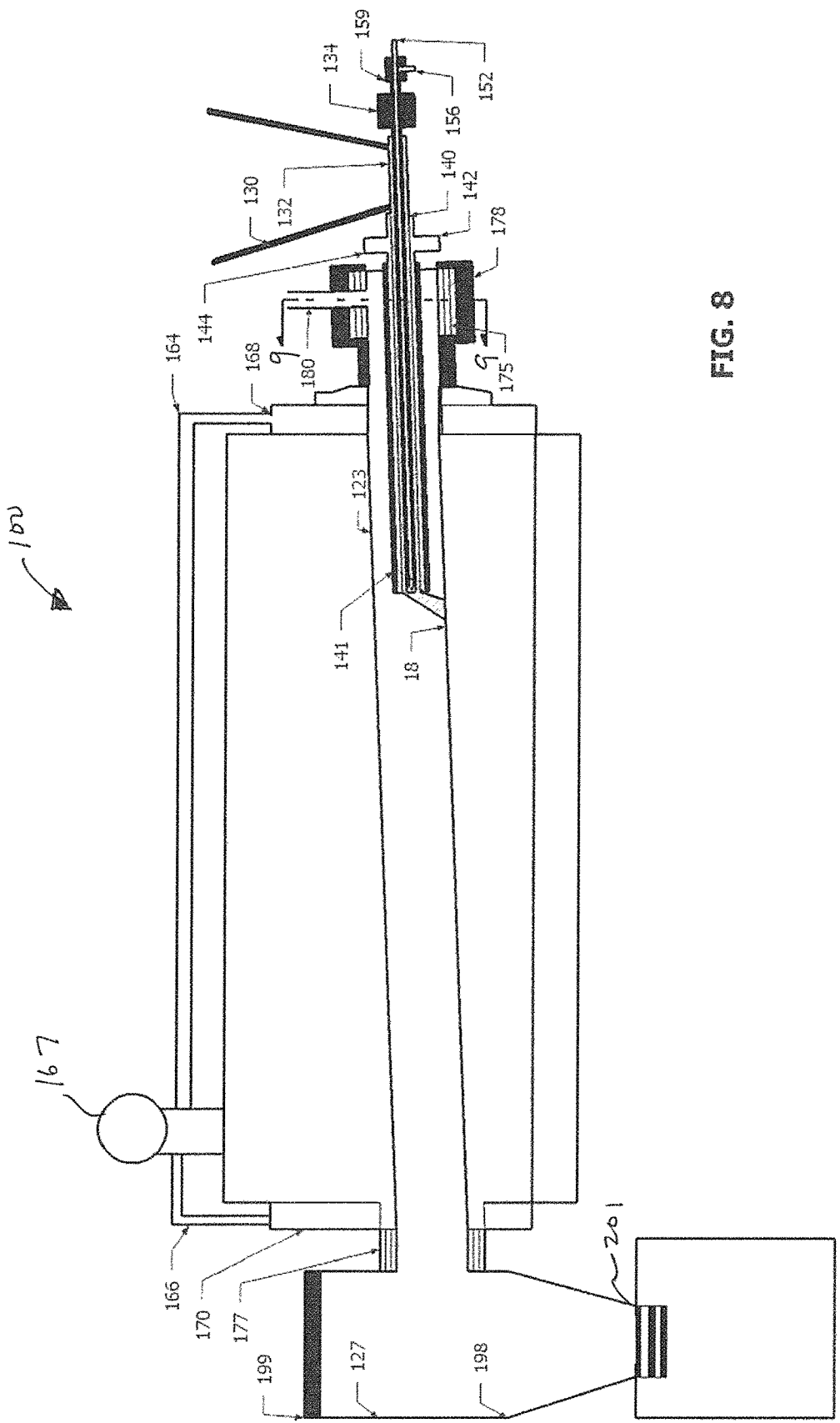
FIG. 8 is a cross-sectional view of the exemplary reactor taken along line 8-8 in FIG. 6.
Figure 8:
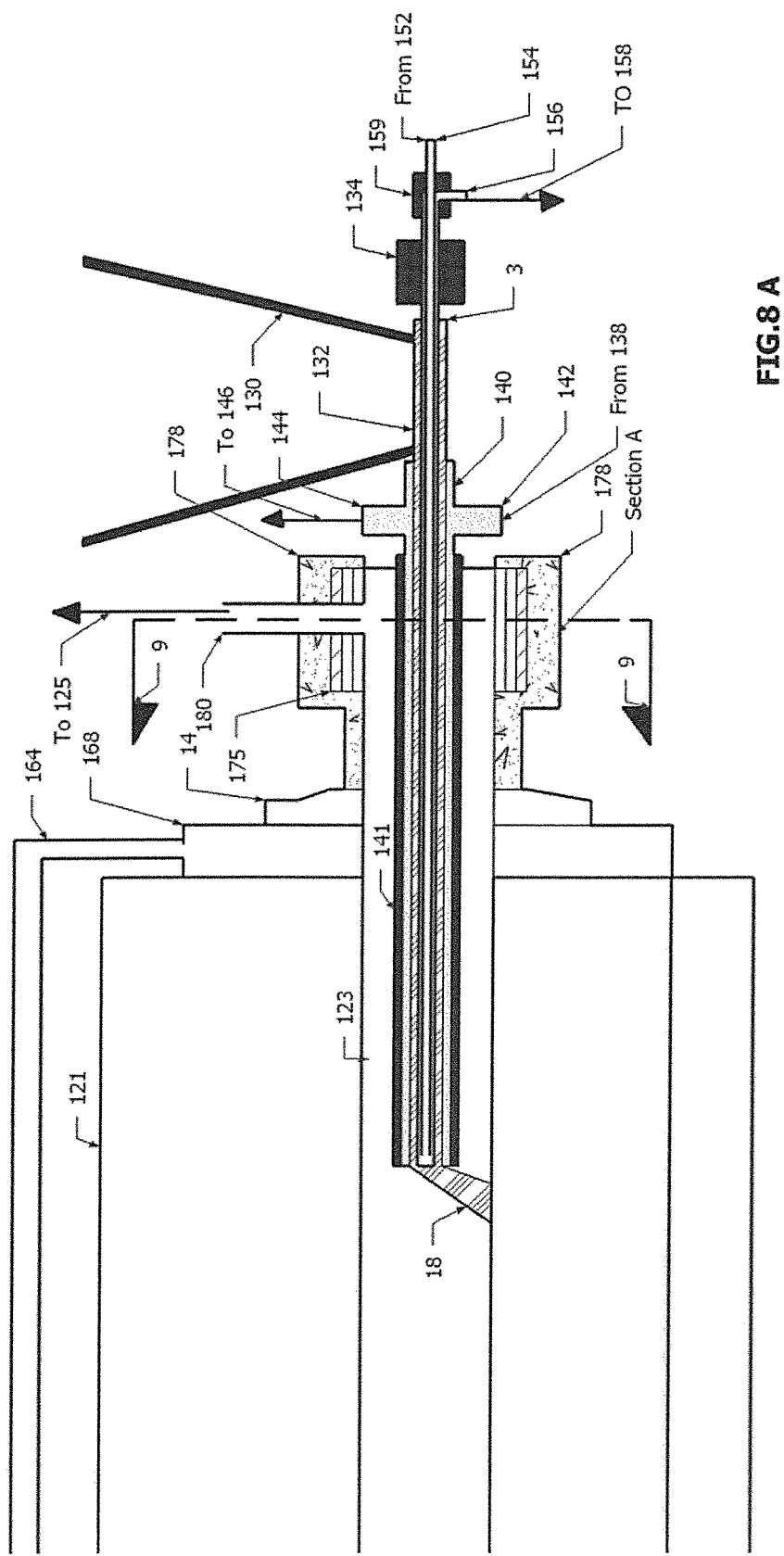
Figure 9A:
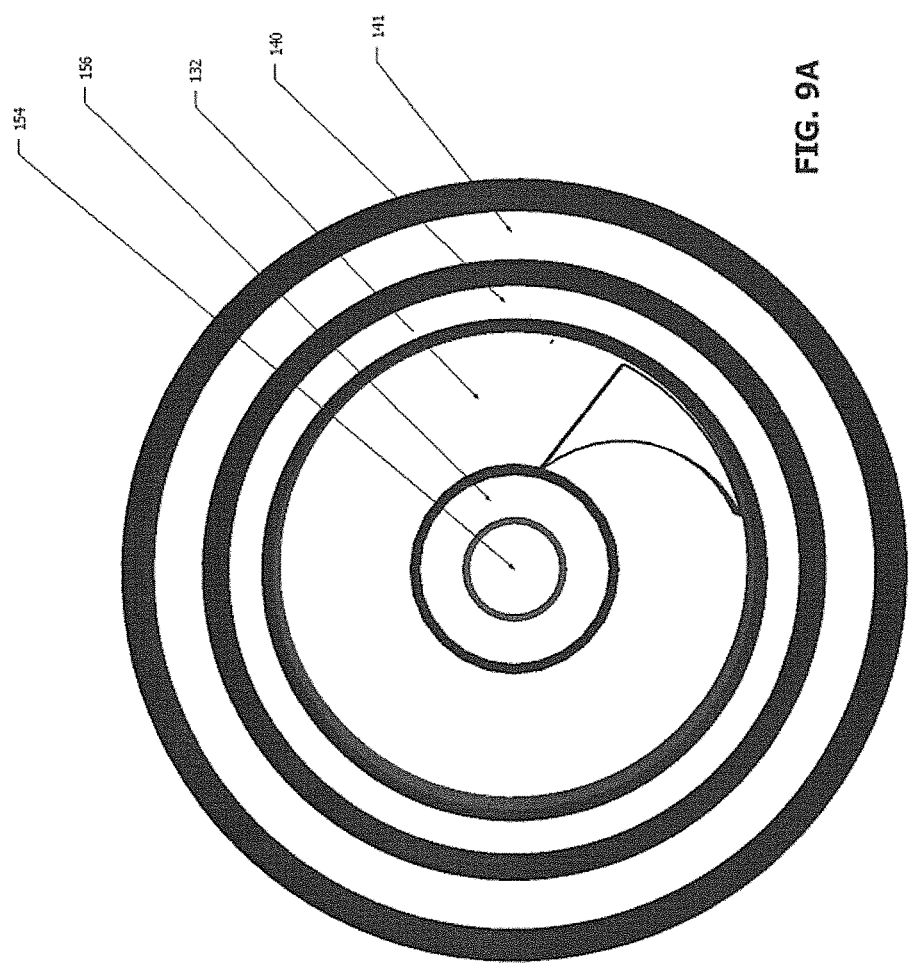
FIG. 9A is an expanded view of Section A from FIG. 9.

Referring now to FIGS. 2-6, 8, 8A, 9 and 9A, the feeding mechanism 110 of the reactor will now be discussed in greater detail. The feeding mechanism 110 is configured to introduce the feedstock materials into the reactor 100, and more particularly into the rotating drum 123, so that the feedstock materials can be processed in accordance with the exemplary methods of the present invention, discussed further below. The feedstock materials may be stored and/or introduced to the feeding mechanism 110 by a hopper 130, which is configured to hold the feedstock materials so that the feedstock materials can be introduced into the reactor 100 by a feed screw 132 operatively coupled to the hopper 130. The feed screw 132 can have any suitable feed screw design as known by those of ordinary skill in the art, and the particular design of the feed screw 132 may be dependent upon the type of feedstock material that is desired to be introduced into the reactor 100. Regardless of the type of feed screw 132 used for any particular application of the feeding mechanism 110, it is understood by those of skill in the relevant art that the feed screw 132 operates by rotation around its longitudinal axis, and such rotation may be imparted to the feed screw 132 by any suitable drive mechanism 134. The drive mechanism 134 may be comprised of a motor and gearbox assembly and be variable frequency drive controlled. The feedstock materials input into the hopper 130 may be gravity fed into the feed screw 132, and the rotation of the feed screw 132 moves the feedstock materials along the longitudinal axis of the feed screw 132 into the rotating drum 123. Proper precautions should be taken in order to prevent influx of atmospheric air and/or oxygen into the rotating drum 123 through the feeding mechanism 110, for example by keeping the hopper 130 full of feedstock materials and/or providing a nitrogen purge into the hopper 130 to prevent introduction of atmospheric air into the rotating drum 123. FIGS. 8 and 8A show how exemplary feedstock material 18 may be inserted and/or transported by the feed screw 132 into the rotating drum 123. It is understood that the identification of the feedstock material 18 is merely exemplary, and that there may be additional feedstock material 18 within the rotating drum 123 that is not illustrated for purposes of clarity.

Still referring to FIGS. 2-6, 8, 8A, 9 and 9A, in order to facilitate introduction of the feedstock materials into the rotating drum 123 and/or introduce the feedstock materials into the rotating drum 123 at desired appropriate temperatures, the feeding mechanism 110 may also include a cooling system operatively coupled to the feed screw 132 in order to maintain the feed screw 132 and/or the feedstock materials at desired and/or constant temperatures. The cooling system includes a fluid reservoir 136 that contains an amount of a fluid coolant, for example water or other suitable liquid used in cooling systems, and the fluid reservoir 136 supplies the cooling system with the coolant. The fluid reservoir 136 is connected to a cool fluid effluent pipe 138 that is connected to a coolant jacket 140 that at least substantially surrounds the feed screw 132. The coolant jacket 140 may preferably extend the entire length of the feed screw 132 and extend into the rotating drum 123, and the portion of the coolant jacket 140 that extends into the rotating drum 123 may be covered by at least one insulation layer 141, which may then be covered by a suitable non-combustible housing, such as a steel pipe. The insulation layer 141 acts to aid in keeping the feedstock material at the desired and/or constant temperature before being introduced into the rotating drum 123. The insulation layer 141 also acts to prevent the coolant within the coolant jacket 140 from becoming heated by the combustion chamber 121, thereby defeating the purpose of the coolant. The insulation layer 141 further acts to reduce and/or eliminate condensation of gases produced from the feedstock materials on the coolant jacket 140, which greatly reduces the efficiently of the reactor 100. It is understood that being able to maintain the feedstock material at the desired and/or constant temperature helps to ensure that the feedstock material has a constant consistency along the entire length of the feed screw 132. The coolant jacket 140 includes an influent portion 142 that receives the coolant from the cool fluid effluent pipe 138 and an effluent portion 144 that allows the coolant to be pumped along the length of the feed screw 132 and absorbed heat from the feed screw 132 and/or feedstock materials to exit the coolant jacket 140 in order to return to the fluid reservoir 136. The effluent portion 144 of the coolant jacket 140 is connected to a hot fluid return pipe 146 that provides the warmed coolant from the coolant jacket 140 to a radiator 148 configured to remove heat from the warmed coolant prior to the coolant returning to the fluid reservoir 136 by a cool fluid influent pipe 150 connecting the radiator 148 and the fluid reservoir 136. The radiator 148 is configured to remove heat from the coolant prior to the coolant being transferred to the fluid reservoir 136 so that the coolant in the fluid reservoir 136 is maintained at appropriate temperatures. The radiator 148 may be any suitable heat transfer mechanism, and may be entirely air-cooled or may have supplement cooling systems including its own condenser, compressor and/or fan.

Still referring to FIGS. 2-6, 8, 8A, 9 and 9A, in addition to the coolant jacket 140 providing cooling around the feed screw 132, the cooling system of the feeding mechanism 110 may further include the introduction of the coolant to an interior of the feed screw 132. In order to effect cooling of the interior of the feed screw 132 in addition to the exterior, a cool fluid diverter line 152 may be connected to the cool fluid effluent pipe 138 in order to divert at least some of the coolant to a center inflow cooling pipe 154 running through the center of the feed screw 132. The coolant runs the length of the center inflow cooling pipe 154 and then returns back along the length of the feed screw 132 by a center outflow cooling pipe 156, which is ultimately connected to the hot fluid return pipe 146 by a return line 158 from the center shaft of the feed screw 132. A two-pass swivel union assembly 159 may be used to connect the cool fluid diverter line 152 to the center inflow cooling pipe 154, and the return line 158 to the center outflow cooling pipe 156. The feeding mechanism 110 may be mounted to the rotating drum 123 assembly on the reactor 100 by a mounting plate 160 in order to secure the feeding mechanism 110 relative to the rotating drum 123 assembly. It is understood that the mounting plate 160 is positioned at a suitable location in order to allow the rotating drum 123 to operate without imparting rotational motion and/or force on the feeding mechanism 110.

Referring now to FIGS. 2-8, 8A, 9 and 9A, the construction and operation of the combustion chamber 121 and the rotating drum 123 of the reactor 100 will now be discussed. It is understood that the combustion chamber 121 in combination with the rotating drum 123 may generally be in the form of a calciner to provide for indirect heated processing of the feedstock materials. The combustion chamber 121 may be any suitable furnace that generally includes a heat source, for example one or more fuel gas burners 162, which may be for example natural gas burners, and one or more combustion and/or exhaust gas exits, for example a front exhaust stack 164 and a rear exhaust stack 166. The front exhaust stack 164 and the rear exhaust stack 166 may be joined at an exhaust vent 167 that vents to the atmosphere or other suitable location. An exhaust blower 169 may be included on the exhaust vent 167 in order to facilitate the removal of exhaust gases and/or fumes from the combustion chamber 121. However, it is understood that the front exhaust stack 164 and the rear exhaust stack 166 may be independently vented to the atmosphere without first being joined together. A front exhaust collector 168 may be positioned at the front of the combustion chamber 121 in order to facilitate collection and direction of the combustion and/or exhaust gases to the front exhaust stack 164, and likewise, a rear exhaust collector 170 may be positioned at the rear of the combustion chamber 121 in order to facilitate collection and direction of the combustion and/or exhaust gases to the rear exhaust stack 166. The combustion chamber 121 through the use of the one or more fuel gas burners 162 is configured to produce heat in order to heat the rotating drum 123, in essence as understood by one of ordinary skill in the art, the combustion chamber 121 provides a heated environment in which the rotating drum 123 can be utilized.

Still referring to FIGS. 2-8, 8A, 9 and 9A, the rotating drum 123 is configured to rotate about its longitudinal axis and rotate independently of the combustion chamber 121 in which the rotating drum 123 is contained. The rotating drum 123 may be positioned at an angle relative to the combustion chamber 121 and/or a surface on which the combustion chamber 121 is installed.

For example, the rotating drum 123 may be positioned 0 to 5° relative to a line perpendicular to the combustion chamber 121 and/or a surface on which the combustion chamber 121 is installed, and even more preferably be positioned between 1 and 2°. The rotating drum 123 may have any suitable drive mechanism, for example a drive motor 171 having a chain drive 172 and sprocket assembly 173. However, it is understood that any suitable drive mechanism capable of imparting rotation to the rotating drum 123 can be used for the present invention, and that the present invention is not limited to any particular type of drive mechanism for the rotating drum 123. In order to allow the rotating drum 123 to rotate independently of the combustion chamber 121 and the other components of the reactor 100, the rotating drum 123 is supported by a front bearing assembly 175 and a rear bearing assembly 177. It is understood that appropriate mechanisms and/or tolerances, as known by those of ordinary skill in the art, may be incorporated with the rotating drum 123 in order to account for any thermal expansion of the rotating drum 123 as the result of heating the rotating drum 123 within the combustion chamber 121. Such mechanisms and/or tolerances should be designed to allow the rotating drum 123 to continue to operate independently of the combustion chamber 121, even after heating of the rotating drum 123 and also provide for air tight seals to prevent influx and/or escape of gases into and out of the rotating drum 123. Appropriate insulation 178 may be installed around the front bearing assembly 175 and the rear bearing assembly 177, and any portion of the rotating drum 123 that extends out of the combustion chamber 121 may also be covered with insulation 178 in order to moderate the temperature of the rotating drum 123. The rotating drum 123 is operatively connected to the condensing system 125 at one end by exit piping 180, and at a second end to the discharge system 127. It is understood that it is preferable that the end of the rotating drum 123 connected to the condensing system 125 should be positioned at least a few degrees higher than the end of the rotating drum 123 connected to the discharge system 127. This configuration allows the gases and other volatiles from the feedstock materials to be transported to the condensing system 125, while the solid and/or residual components of the feedstock materials are transported to the discharge system 127. As shown for example in FIG. 9, the rotating drum 123 may also include a star bar 182 positioned therein, and configured to roll around at the bottom of the rotating drum 123 in order to deagglomerate the feedstock materials. It is understood that the exit piping 180 is not affixed to the rotating drum 123 so that the rotating drum 123 is free to rotate relative to the exit piping 180, but that suitable leak-tight and/or air-tight connections are made between the rotating drum 123 and the exit piping 180 to eliminate influx and escape of gases and other volatiles.

Referring now to FIGS. 2-7, the condensing system 125 of the reactor 100 will now be discussed. As mentioned above, the condensing system 125 is coupled to the rotating drum 123 by the exit piping 180 so that gases and other volatiles from the feedstock materials is permitted to escape the rotating drum 123 and be transported into the condensing system 125. The condensing system 125 may have any suitable mechanisms known in the art to condense, collect and/or separate gases and/or volatiles into separate components, i.e. a gaseous and/or volatile mixture exiting the rotating drum 123 can be separated into its individual and/or related components. The condensing system 125 may include a "heavy ends" condensed oil collection pipe 184 positioned a suitable distance away from the rotating drum 123 to allow for collection of "heavy ends" oil in a "heavy ends" oil collection tank 186. It is understood that the "heavy ends" oil may be condensed by increase in pressure and/or decrease in temperature as the result of ambient air cooling or additional cooling mechanisms, such as a fluid coolant system. Next the exit piping 180 may extend into a condensing system pipe 188, which is connected to a "middle weight" condensed oil collection tank 190. It is understood that the "middle weight" oil may be condensed by increase in pressure and/or decrease in temperature as the result of ambient air cooling or additional cooling mechanisms, such as a fluid coolant system. Further condenser piping 192 extends between the "middle weight" condensed oil collection tank 190 and a "light end" condensed oil collection tank 194. The "light end" condensed oil collection tank 194 is further connected to a rotary screw gas compressor and regulator 196 that is configured to pressurize combustible non-condensable gas and other volatiles from the rotating drum 123 for feeding the one or more fuel burners 162 in order to provide heat to the combustion chamber 121. It is understood that the reactor 100 may be configured to provide fuel for the fuel burners 162 entirely from the gases and/or volatiles produced from the feedstock materials or that the fuel burners 162 may be supplemented by additional fuel products, for example natural gas and/or propane. Any combustible or non-combustible gas that is not used by the fuel burners 162 may be cleaned, consumed, or otherwise properly processed prior to release to the atmosphere or other appropriate location by vent connector piping 197 extending past the last fuel burner 162.

Referring now to FIGS. 4-8, the discharge system 127 of the reactor 100 according to the present invention will now be discussed. The discharge system 127 includes an airlock assembly 198 that is connected to the rotating drum 123 by at least a substantially air-tight connection so that the rotating drum 123 is free to rotate, but that no influx or egress of air or other gases is allowed in or out of the rotating drum 123 and the discharge system 127. The airlock assembly 198 is configured to collect and/or retain solid and/or residual components of the feedstock materials after the feedstock materials have been heated in the rotating drum 123. The airlock assembly 198 may include an airlock lid 199 that permits access to the airlock assembly 198 during maintenance and/or inspection of the discharge system 127. The airlock assembly 198 is connected to an airlock 201 that is configured to allow discharge of the solid and/or residual components of the feedstock materials from the airlock assembly 198 for collection without allowing the influx of oxygen or other gases into the reactor 100 when the components are removed from the airlock assembly 198.

Referring now to FIG. 1, an exemplary method according to the present invention is shown for the processing of feedstock materials in order to recover, reuse and/or recycle the constituent components of the waste products and/or raw materials. The exemplary feed stock material that may be processed according to the present invention could be asphalt roofing shingles, and the method of processing the asphalt roofing shingles according to the present invention is discussed specifically with respect to FIG. 1, with general references made to FIGS. 2-8, 8A, 9, 9A and 10 as to how the exemplary reactor 100 according to the present invention can be used to implement the method outlined in FIG. 1. As shown in step S10 a feedstock material, such as asphalt roofing shingles are obtained. The asphalt roofing shingles may be obtained from sources such as, waste from manufacturers of asphalt roofing shingles or asphalt roofing shingles that have been removed from structures after installation of the asphalt roofing shingles. In general, asphalt roofing shingles are comprised of approximately 20-30% bitumen, approximately 1-5% glass and/or natural fibers and approximately 70-80% minerals with mesh sizes between 320 and 10. Of the minerals, approximately two-thirds to one-half are silicon based minerals with a mesh size between 80 and 10, and approximately one-half to one-third are calcium based minerals with a mesh size 80 or higher. The intention of exemplary embodiments of the present invention is to process feedstock materials, such as the asphalt roofing shingles, in order to recover, reuse and/or recycle at least a useable portion of the components, such as the exemplary components discussed above with respect to the asphalt roofing shingles, of the feedstock materials.

Still referring to FIG. 1, the method for processing feedstock materials, such as asphalt roofing shingles, may also include a step S20 in which the asphalt roofing shingles are ground with a suitable grinding apparatus into pieces with sizes of one inch or less. However, it is understood that the present invention is not limited to grinding the asphalt roofing shingles to any particular piece size, as sizes larger than one inch may also be compatible with asphalt roofing shingles and other feedstock materials according to the present invention. It is understood that water may already be present in the asphalt roofing shingles when obtained in step S10, or additional water may be added in order to facilitate the grinding step S20. The method may also include a step S30 of conditioning the ground asphalt roofing shingles, for example by allowing the ground asphalt roofing shingles to drain freely, drying either through application of heat, reduction of vapor pressure or conditioning at ambient temperatures, in order to obtain a consistent moisture content throughout the ground asphalt roofing shingles. Preferably, the moisture content of the ground shingles may be approximately 2% water by weight.

Once the moisture content of the ground asphalt roofing shingles has reached a consistent level the ground asphalt roofing shingles may be fed into the reactor 100 discussed above with respect to FIGS. 2-8. Preferably, the reactor 100 is configured as an anaerobic reactor capable of processing the asphalt roofing shingles in the absence of oxygen. Any suitable feeding mechanism may be used in order to feed the ground asphalt roofing shingles into the reactor 100, including the feeding mechanism 110 discussed above with respect to FIGS. 2-8. Preferably the feeding mechanism should be capable of keeping oxygen out of the reactor and be insulated and/or non-thermally conducting so that the heat from the reactor is not transferred to the feeding mechanism, such as is accomplished with the feed screw 132 and coolant jacket 140 of the feeding mechanism 110 discussed above. As an alternative, a ram feed system (not shown) may be used that is insulated from the reactor 100. Even more preferably the feed screw 132 of the feeding mechanism 110 should be kept at a temperature, either though the insulation 141 and/or the coolant jacket 140, that is outside the range of 100-800° F. However, it is understood that the present invention is not limited to any particular temperature or temperature range for the feeding mechanism 110, and the temperature and/or operation of the feeding mechanism 110 may be correlated to the feedstock material being fed into the reactor 100. Furthermore, as shown in FIG. 1, the method of the present invention may also include an optional step S35 of adding a hydrogen donor material, for example, waste polymer, ground coal, charcoal and/or pyrolyzed wood, or other plastics and rubbers, such as plastics containing glass fill, to the reactor 100 in addition to the asphalt roofing shingles. This donor material, may be fed into the reactor 100 in the same manner as the other feedstock material, and either mixed, either before or after being put into the hopper 130, with the feedstock material or added separately from the feedstock material.

Figure 10:
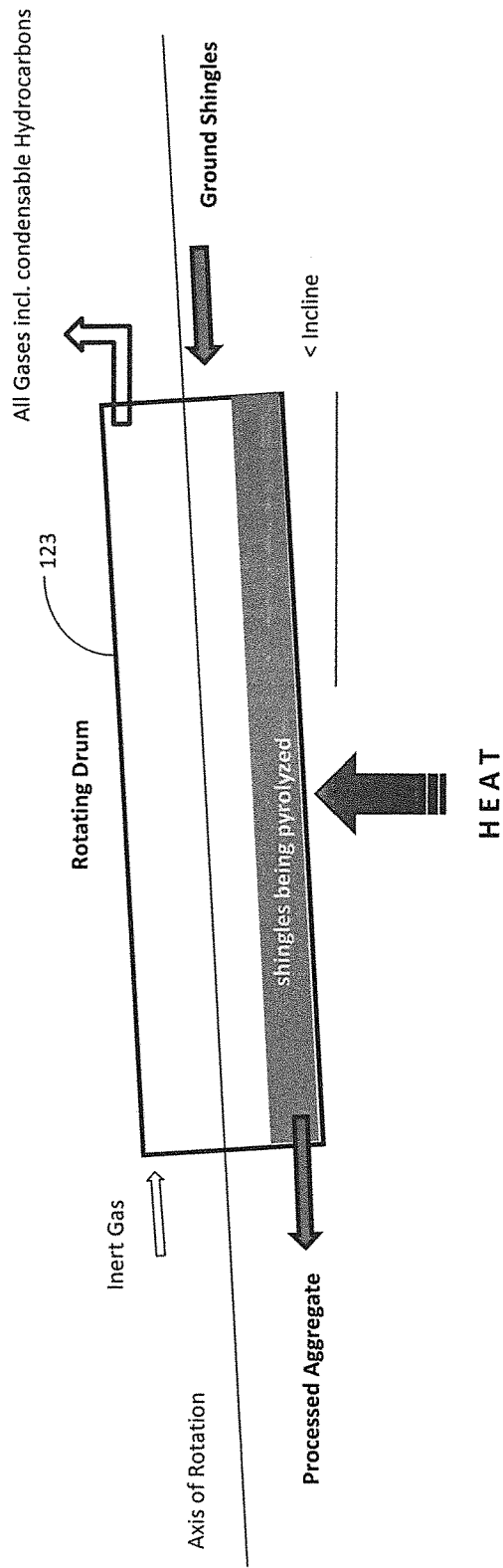
FIG. 10 is a simplified diagram of the exemplary reactor that may be used for processing waste products and/or raw materials according to an exemplary embodiment of the present invention.

While the exemplary reactor 100 discussed above with respect to FIGS. 2-8 may be used in accordance with the process of the present invention, FIG. 10 shows a simplified version of a reactor that includes a rotating drum 123 that may be used for the exemplary method of processing asphalt roofing shingles shown in FIG. 1. In general, the reactor should be capable of providing high heat, for example approximately 1,100° F. or greater, in the absence of oxygen in order to thermally decompose the organic material in the asphalt roofing shingles, or other organic waste product or raw material, and also be capable of mixing and/or agitating the asphalt roofing shingles. Other exemplary reactors that may be used with the present invention include fluidized beds and other reactors with mechanical mixing means. As shown in FIG. 10, and as previously discussed, the rotating drum 123 may be positioned at an incline in order to direct the processed asphalt roofing shingles from one end of the reactor to the other. In addition, as shown in FIG. 10, heat is applied to the rotating drum in order to pyrolyze the asphalt roofing shingling that have been fed into the rotating drum.

Referring again to FIG. 1, the exemplary method according to the present invention may also include a step S40 of heating the asphalt roofing shingles in the reactor 100 to a temperature of 1,100° F. or greater in the absence of oxygen. It may also be preferable to set up a temperature gradient in the reactor 100 so that the temperature increases from the feed side of the rotating drum 123 to the exit side of the rotating drum 123. This can be accomplished through use of multiple fuel burners 162, and modifying the heat output of each fuel burner 162 to create a temperature gradient along the combustion chamber 121 of the reactor 100. However, it is understood that the temperature gradient may also increase and decrease along the length of the reactor 100, and may increase or decrease a number of times along the length of the reactor 100. As a result of the application of heat in step S40 the constituent components of the asphalt roofing shingles begin to separate. The bitumen component of the asphalt roofing shingles liquefies and cracks to produce non-condensable hydrocarbon gases and medium length (C6 or more) hydrocarbon liquids and oils. Continued heating of these hydrocarbon products within the reactor produces a hydrocarbon gas mixture of cracked and gasified hydrocarbon, and in step S50 these hydrocarbons are removed from the rotating drum 123 of the reactor 100. For example, these hydrocarbons may be released out of the exit piping 180 of the rotating drum 123. The flow of the hydrocarbon gas mixture may be aided by the flow of the inert gas, for example nitrogen, that is provided into the rotating drum 123 at the other end of the rotating drum 123 from the exiting piping 180 for the hydrocarbon gas mixture. The glass fibers and mineral components of the asphalt roofing shingles then remain in the rotating drum 123 as a solid residue.

Referring again to FIG. 1, the hydrocarbon gas mixture released from the reactor is provided to the condensing system 125 in step S60 in order to condense C6 and greater hydrocarbons to produce products such as crude oil or light gas oil in step S62. C6 and greater hydrocarbons are hydrocarbons that contain at least six carbon atoms in their molecular structure. These hydrocarbons may be condensed in a single condensing unit or they may be condensed and separated further based on whether the hydrocarbons are considered to be "high," "medium" or "light" hydrocarbons. The C1-C5 non-condensable gas hydrocarbons that are not condensed in the condensing system 125 are captured in step S64 by the rotary screw gas compressor 196 and may be redirected to be used as fuel for the fuel burners 162 in step S66 as the heat source used for the reactor 100. It is also contemplated that the non-condensable gas hydrocarbons may also be used as a fuel source for other systems, such as a building heating system, and any unused non-condensable gas hydrocarbons may be cleaned, consumed, or otherwise properly processed prior to release to the atmosphere or other appropriate location. Accordingly, the vent connector piping 197 may connect to a vent (not shown) that directs the non-condensable gases to be cleaned, consumed, or otherwise properly processed prior to release to the atmosphere or other appropriate location.

Still referring to FIG. 1, the processed aggregate that includes the solid residue of the asphalt roofing shingles may be removed from the reactor 100 in step S70 for further processing. This processed aggregate includes the glass fibers and mineral components, as well as a carbon residue that includes coke and/or petroleum coke that may be coated on the mineral components. The processed aggregate or a portion thereof may then be separated into small and large particles in a step S72 in order to provide small particles with coke in step S73 and large particles with coke in step S74. Alternatively, the processed aggregate or a portion thereof may be heated to at least 1,500-2,000° F. in the absence of oxygen in step S75 in order to release oxygen from the minerals to oxidize the coke and/or petroleum coke residue on the minerals in order to provide a clean aggregate mix in step S78. It is understood that this step S75 may occur in the reactor 100 prior to the solid residue of the asphalt roofing shingles being removed from the reactor 100. Alternatively, the processed aggregate or a portion thereof may be heated in step S80 in the presence of oxygen at a temperature of 1,100° F. or greater in order to combust the coke and/or petroleum coke residue that may be present on the minerals to provide a clean aggregate mix in step S78. The heat generated from the combustion of the coke and/or petroleum coke may be recycled for use in the process or used for other systems, such as a building heating system.

Still referring to FIG. 1, the small particles including coke, such as calcium based minerals, e.g. $CaCO_3$, from step S73 may be used as a processing additive in other industrial processes. The large particles with coke from step S74 may be processed in step S82 that is similar to step S80 in order to combust the coke and/or petroleum coke residue on the large particles to produce a cleaned aggregate mix. The clean aggregate mix from step S78 and the cleaned aggregate mix produced from step S82 may then be separated into individual components though classification and sieving in step S84. Step S84 may then produce glass fibers, coarse minerals, medium minerals and fine minerals. These materials may then be reused and/or recycled to produce new products, such as being used to produce new asphalt roofing shingles.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense.

It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A reactor configured to process feedstock materials, comprising:
    a feeding mechanism configured to feed the feedstock materials at a constant temperature to the reactor;
    a rotating drum operatively connected to the feeding mechanism and configured for heating the feedstock materials at a temperature of 1,100° F. or higher in an anaerobic environment to produce cracked and gasified hydrocarbons and residual material;
    a condensing system operatively connected to the rotating drum and configured to receive cracked and gasified hydrocarbons released from the feedstock materials from the reactor;
    a discharge system operatively connected to the rotating drum and configured to remove the residual material from the rotating drum without introducing oxygen into the rotating drum in order to recover one or more constituent component of the feedstock materials; and
    a combustion chamber operatively connected to the condensing system and configured for oxidizing the cracked and gasified hydrocarbons removed from the rotating drum having five or less carbon atoms in their molecular structure in order to produce heat to obtain the temperature of 1,100° F. or higher for the rotating drum;
    wherein the feeding mechanism comprises a feed screw having an interior region and configured to transport the feedstock materials into the reactor, and a coolant system having a coolant jacket substantially surrounding the feed screw and at least one fluid pipe extending at least partly along the interior region of the feed screw; and
    wherein the coolant system is configured to keep the constant temperature of the feeding mechanism at greater than or less than the range of 100 to 800° F.

2. The reactor according to claim 1, wherein the rotating drum is configured for heating the residual material at a temperature of 1,500° F. or higher in an anaerobic environment.

3. The reactor according to claim 1, wherein a portion of the coolant jacket extends into the rotating drum, and at least one layer of insulation at least partially surrounds the portion of the coolant jacket extending to the rotating drum.

4. The reactor according to claim 1, wherein the coolant system comprising an amount of coolant, and is configured to circulate at least a portion of the amount of coolant to the coolant jacket and the at least one fluid pipe for maintaining the constant temperature of the feeding mechanism.

5. The reactor according to claim 1, wherein the condensing system is configured to condense the cracked and gasified hydrocarbons removed from the thermal reactor having greater than five carbon atoms in their molecular structure.

6. The reactor according to claim 1, wherein the discharge system comprises an airlock assembly configured to receive residual material from the rotating drum and allow for removal of the residual material from the discharge system without introduction of oxygen into the rotating drum.

7. The reactor according to claim 3, wherein the at least one layer of insulation is configured to prevent condensation of the cracked and gasified hydrocarbons released from the feedstock materials on the coolant jacket of the feeding mechanism.

* * * * *